US010419227B2

(12) United States Patent
Large et al.

(10) Patent No.: US 10,419,227 B2
(45) Date of Patent: Sep. 17, 2019

(54) NETWORK CARD

(71) Applicants: ALLIED TELESIS HOLDINGS K.K., Tokyo (JP); Allied Telesis Holdings Kabushiki Kaisha, Tokyo (JP); Allied Telesis, Inc., Bothell, WA (US)

(72) Inventors: Sean David Large, Bothell, WA (US); Douglas D. Barga, Bellevue, WA (US)

(73) Assignee: ALLIED TELESIS HOLDINGS KABUSHIKI KAISHA (JP)

( * ) Notice: Subject to any disclaimer, the term of this patent is extended or adjusted under 35 U.S.C. 154(b) by 0 days.

(21) Appl. No.: 15/865,007

(22) Filed: Jan. 8, 2018

(65) Prior Publication Data
US 2018/0198633 A1    Jul. 12, 2018

Related U.S. Application Data

(60) Provisional application No. 62/444,170, filed on Jan. 9, 2017, provisional application No. 62/448,838, filed on Jan. 20, 2017.

(51) Int. Cl.
*H04L 12/28* (2006.01)
*H04L 12/12* (2006.01)
(Continued)

(52) U.S. Cl.
CPC .......... *H04L 12/12* (2013.01); *G06F 13/4068* (2013.01); *G06F 13/4286* (2013.01);
(Continued)

(58) Field of Classification Search
None
See application file for complete search history.

(56) References Cited

U.S. PATENT DOCUMENTS

2004/0085972 A1\* 5/2004 Warren ................ H04L 12/433
370/401
2005/0097378 A1\* 5/2005 Hwang ................ G06F 1/3203
713/320
(Continued)

*Primary Examiner* — Phirin Sam
(74) *Attorney, Agent, or Firm* — Michael Zarrabian; Brooks Acordia IP Law, PC

(57) ABSTRACT

A network interface controller (NIC), comprising: a Gigabit Fiber Transceiver; a Gigabit Ethernet Controller; a Gigabit Ethernet Switch; and a microprocessor unit (MPU), where the MPU initializes the Gigabit Ethernet Switch to pass Ethernet packets unmolested between the Gigabit Fiber Transceiver and the Gigabit Ethernet Controller, where the Gigabit Ethernet Switch maintains a link between the Gigabit Ethernet Controller and the Gigabit Fiber Transceiver whether or not a link speed between the Gigabit Ethernet Switch and the Gigabit Fiber Transceiver matches a link speed between the Gigabit Ethernet Switch and the Gigabit Ethernet Controller, where the MPU configures the Gigabit Ethernet Switch to match a link speed between the Gigabit Ethernet Switch and the Gigabit Fiber Transceiver with a link speed between the Gigabit Ethernet Switch and the Gigabit Ethernet Controller during normal operation, and where the Gigabit Ethernet Controller can respond to a Wake on LAN (WoL) request from a network.

11 Claims, 8 Drawing Sheets

(51) Int. Cl.
*G06F 13/42* (2006.01)
*H04L 12/933* (2013.01)
*G06F 13/40* (2006.01)
*H04L 12/935* (2013.01)
*H04B 10/40* (2013.01)

(52) U.S. Cl.
CPC .............. *H04L 49/15* (2013.01); *H04L 49/30* (2013.01); *G06F 2213/0026* (2013.01); *H04B 10/40* (2013.01); *Y02D 50/40* (2018.01); *Y02D 50/42* (2018.01)

(56) References Cited

U.S. PATENT DOCUMENTS

| | | | |
|---|---|---|---|
| 2011/0026525 A1* | 2/2011 | He | H04L 49/351 370/392 |
| 2011/0081145 A1* | 4/2011 | Burrell | H04L 12/413 398/41 |
| 2013/0315256 A1* | 11/2013 | Balakavi | H04L 49/602 370/401 |
| 2014/0122833 A1* | 5/2014 | Davis | G06F 15/7803 712/29 |
| 2016/0241293 A1* | 8/2016 | Huang | H04B 1/40 |
| 2017/0150378 A1* | 5/2017 | Dumov | H04W 24/04 |
| 2018/0091251 A1* | 3/2018 | Hanneman, Jr. | G02B 6/293 |

* cited by examiner

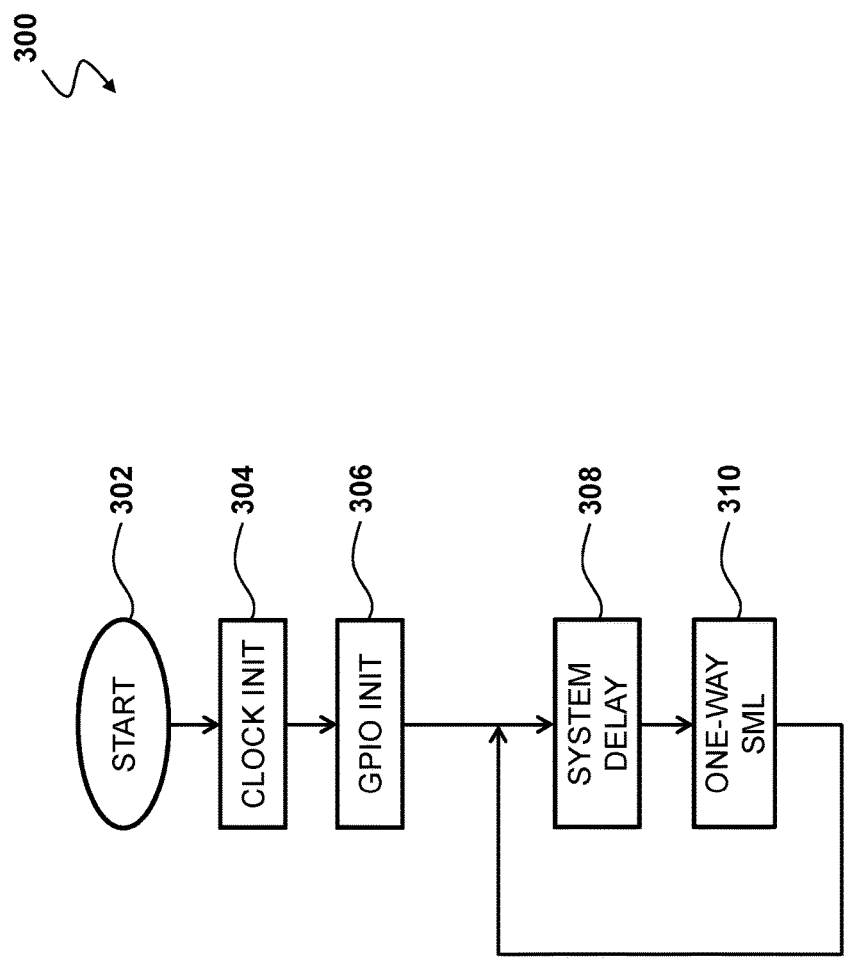

NETWORK CARD

CROSS-REFERENCE TO RELATED APPLICATIONS

This applications claims priority to and the benefit of U.S. Provisional Application No. 62/444,170, filed Jan. 9, 2017 and U.S. Provisional Application No. 62/448,838, filed Jan. 20, 2017, the disclosures of which are incorporated by reference herein for all purposes.

TECHNICAL FIELD

The invention, in its several embodiments, pertains to network interface controllers (NIC), and more particularly, to Wake on LAN (WoL) for NIC.

BACKGROUND

Gigabit Fiber network interface controllers (NICs) may not offer Wake on Lan (WoL) functionality. When the NIC is connected to a PC and the PC goes into a sleep mode, a Gigabit Ethernet Controller of the NIC may go into a power saving mode. This power saving mode may cause the Gigabit Ethernet Controller to change connection type to a slower link. With copper Ethernet links, the link speed may be renegotiated to the slower link. However, with fiber links, the speed may not be adjusted, which can cause a break in a network connection between the Gigabit Ethernet Controller and a network. When a WoL request is sent by the network, it cannot be received by the Gigabit Ethernet Controller as the network connection has been broken.

SUMMARY

An exemplary network interface controller (NIC), may include: a Gigabit Fiber Transceiver; a Gigabit Ethernet Controller; a Gigabit Ethernet Switch; and a microprocessor unit (MPU). The MPU may initialize the Gigabit Ethernet Switch to pass Ethernet packets unmolested between the Gigabit Fiber Transceiver and the Gigabit Ethernet Controller. The Gigabit Ethernet Switch may maintain a link between the Gigabit Ethernet Controller and the Gigabit Fiber Transceiver whether or not a link speed between the Gigabit Ethernet Switch and the Gigabit Fiber Transceiver matches a link speed between the Gigabit Ethernet Switch and the Gigabit Ethernet Controller. The MPU may configure the Gigabit Ethernet Switch to match the link speed between the Gigabit Ethernet Switch and the Gigabit Fiber Transceiver with the link speed between the Gigabit Ethernet Switch and the Gigabit Ethernet Controller during normal operation. The Gigabit Ethernet Controller can respond to a Wake on LAN (WoL) request from a network.

In additional NIC embodiments, the NIC may be configured to fit into a PCIe slot on a PC motherboard of a PC. The link speed between the Gigabit Ethernet Switch and the Gigabit Ethernet Controller may be 1000-T when the PC is active. The link speed between the Gigabit Ethernet Switch and the Gigabit Ethernet Controller may be 100-TX when the PC is active. The link speed between the Gigabit Ethernet Switch and the Gigabit Fiber Transceiver may be decoupled from the link speed between the Gigabit Ethernet Switch and the Gigabit Ethernet Controller. The MPU may be further configured to detect a link down on a first port of the Gigabit Ethernet Switch connected to the Gigabit Fiber Transceiver. The MPU may be further configured to pass a status of the link down to a second port of the Gigabit Ethernet Switch connected to the Gigabit Ethernet Controller, where the PC receives the status as a loss of fiber link.

The first port of the Gigabit Ethernet Switch connected to the Gigabit Fiber Transceiver is set at a constant link speed. The NIC of claim 8, where a second port of the Gigabit Ethernet Switch connected to the Gigabit Ethernet Controller is set to auto-negotiate to a highest possible link speed, and where the Gigabit Ethernet Controller enters a low power mode when the PC is turned off. The WoL request from the network may be received at the Gigabit Ethernet Controller.

An exemplary method embodiment may include: providing power to a network interface controller (NIC); resetting, by a microprocessor unit (MPU) in communication with a Gigabit Ethernet Switch via a serial management interface (SMI), all of the Gigabit Ethernet Switch settings to default; setting, by the MPU, the Gigabit Ethernet Switch to pass all packets unmolested; disabling, by the MPU, a port linking the Gigabit Ethernet Switch and a Gigabit Ethernet Controller causing a PC connected to the Gigabit Ethernet Controller to indicate no link; and reading, by the MPU, a board ID to determine a type of optic installed.

Exemplary method embodiments may also include: determining, by the MPU in communication with a small form-factor pluggable (SFP) cage via an inter-integrated circuit (I2C) link, if SFP module is installed; determining, by the MPU, a type of the installed SFP module; setting, by the MPU, a port of the Gigabit Ethernet Switch linking the Gigabit Ethernet Switch and the SFP Cage to a 100-FX mode if the determined type of the installed SFP module is 100-FX type; and setting, by the MPU, the port of the Gigabit Ethernet Switch linking the Gigabit Ethernet Switch and the SFP Cage to a 1000-X mode if the determined type of the installed SFP module is 1000-X type. The method may further include: determining, by the MPU, a fiber link status.

An exemplary system embodiment may include: a network interface controller (NIC), including: a small form-factor pluggable (SFP) Cage; a Gigabit Ethernet Controller; a Gigabit Ethernet Switch; and a microprocessor unit (MPU). The MPU may initialize the Gigabit Ethernet Switch to pass Ethernet packets unmolested between the SFP Cage and the Gigabit Ethernet Controller. The Gigabit Ethernet Switch may maintain a link between the Gigabit Ethernet Controller and the SFP Cage whether or not a link speed between the Gigabit Ethernet Switch and the SFP Cage matches a link speed between the Gigabit Ethernet Switch and the Gigabit Ethernet Controller. The MPU may configure the Gigabit Ethernet Switch to match the link speed between the Gigabit Ethernet Switch and the SFP Cage with the link speed between the Gigabit Ethernet Switch and the Gigabit Ethernet Controller during normal operation. The Gigabit Ethernet Controller can respond to a Wake on LAN (WoL) request from a network.

Additional system embodiments may further include an SFP Module, where the SFP Cage is configured to receive the SFP Module. The MPU may be further configured to read the SFP module speed via an inter-integrated circuit (I2C) link between the MPU and the SFP cage when the SFP Module is detachably attached to the SFP Cage. The system may also include a PCIe slot on a PC motherboard of a PC, wherein the PCIe slot is configured to receive the NIC. The MPU may be further configured to detect a link down on a first port of the Gigabit Ethernet Switch connected to the SFP Cage. The MPU may be further configured to pass a status of the link down to a second port of the Gigabit Ethernet Switch connected to the Gigabit Ethernet Controller. The PC may receive the status as a loss of fiber link.

In additional system embodiments, a first port of the Gigabit Ethernet Switch connected to the SFP Cage may be set at a constant link speed. A second port of the Gigabit Ethernet Switch connected to the Gigabit Ethernet Controller may be set to auto-negotiate to a highest possible link speed. The Gigabit Ethernet Controller may enter a low power mode when the PC is turned off. The WoL request from the network may be received at the Gigabit Ethernet Controller.

BRIEF DESCRIPTION OF THE DRAWINGS

Embodiments are illustrated by way of example and not limitation in the figures of the accompanying drawings, which may not be drawn to scale, and in which:

FIG. 3 depicts an exemplary block diagram of a Wake on LAN (WoL) function for the exemplary Gigabit Ethernet Controller in FIGS. 2A-2B.

DETAILED DESCRIPTION

Figure 1:
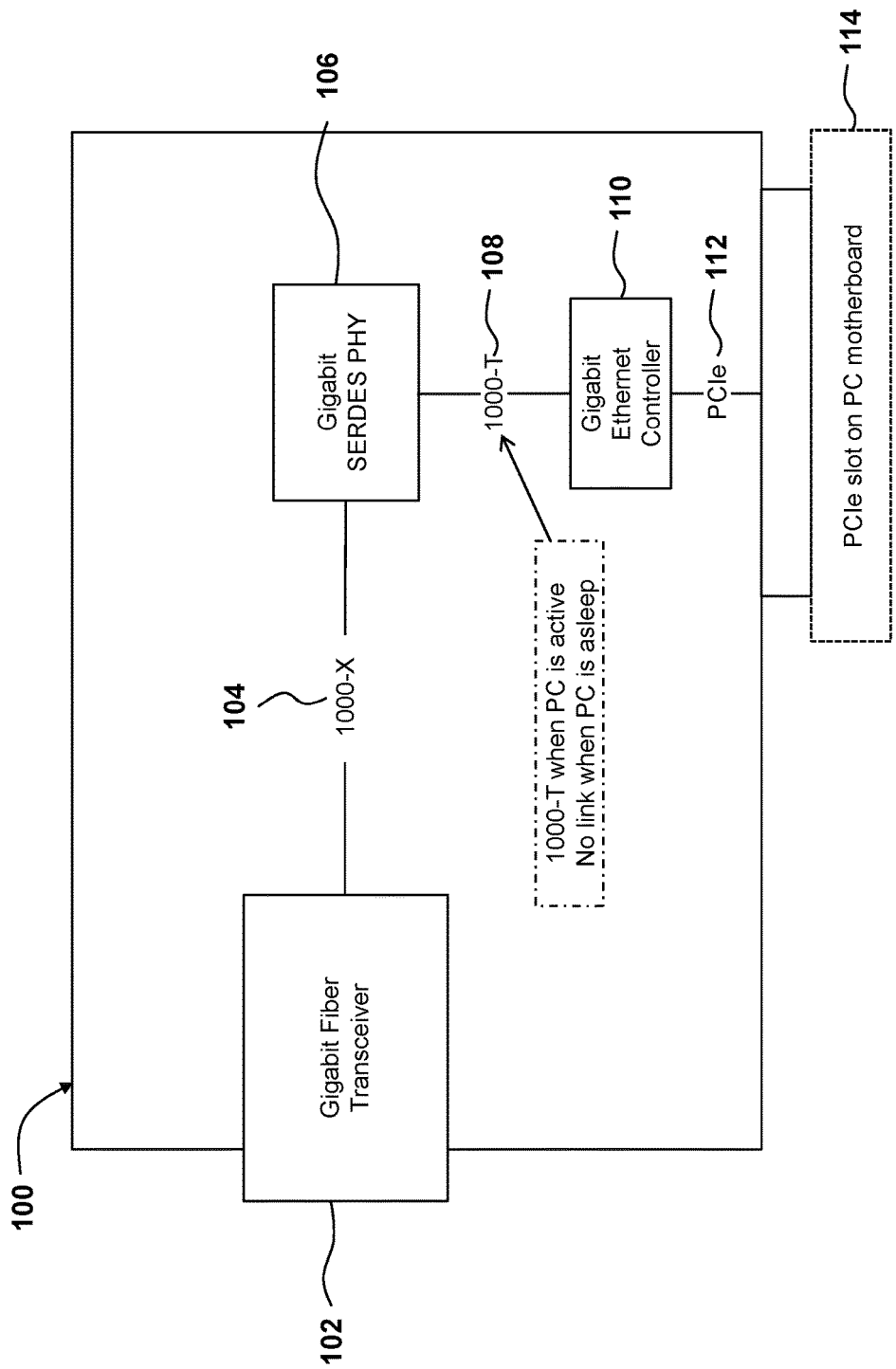
FIG. 1 depicts a Gigabit Fiber network interface controller (NIC).

The description herein is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

A network interface controller (NIC) disclosed herein, includes: a Gigabit Fiber Transceiver; a Gigabit Ethernet Controller; a Gigabit Ethernet Switch; and a microprocessor unit (MPU), where the MPU initializes the Gigabit Ethernet Switch to pass Ethernet packets untouched between the Gigabit Fiber Transceiver and the Gigabit Ethernet Controller, where the Gigabit Ethernet Switch maintains a link between the Gigabit Ethernet Controller and the Gigabit Fiber Transceiver whether or not a link speed between the Gigabit Ethernet Switch and the Gigabit Fiber Transceiver matches a link speed between the Gigabit Ethernet Switch and the Gigabit Ethernet Controller, where the MPU configures the Gigabit Ethernet Switch to match a link speed between the Gigabit Ethernet Switch and the Gigabit Fiber Transceiver with a link speed between the Gigabit Ethernet Switch and the Gigabit Ethernet Controller during normal operation, and where the Gigabit Ethernet Controller can respond to a Wake on LAN (WoL) request from a network.

Referring to the drawings, embodiments of a network interface controller and Wake on LAN (WoL) are disclosed herein. A Gigabit Ethernet Controller 110 is implemented as an integrated circuit (IC) including drivers to make the Gigabit Ethernet Controller 110 work with PC operating systems (e.g., Windows, Linux, etc.). The Gigabit Ethernet Controller 110 is designed for desktop PC applications that do not have a 1000-X interface to work with fiber transceivers, because the vast majority of desktop PC's do not need fiber connections. In order to offer a fiber network interface controller (NIC) 100, a dual port Gigabit SERDES PHY IC 106 is added to translate the 1000-T port 108 to 1000-X 104.

When the PC goes to sleep, in order to support WoL, the NIC 100 must maintain links (108, 104) while the PC is asleep to be able to react to the wake signal from the network. The Gigabit Ethernet Controller 110 will change connection type to 100-TX in order to save power for sleep mode. On standard "copper" connections, this is not a problem because Ethernet links will simply renegotiate to 100-TX. However, fiber connections are not able to adjust speed, and so this breaks the network connection 108.

Figure 2A:
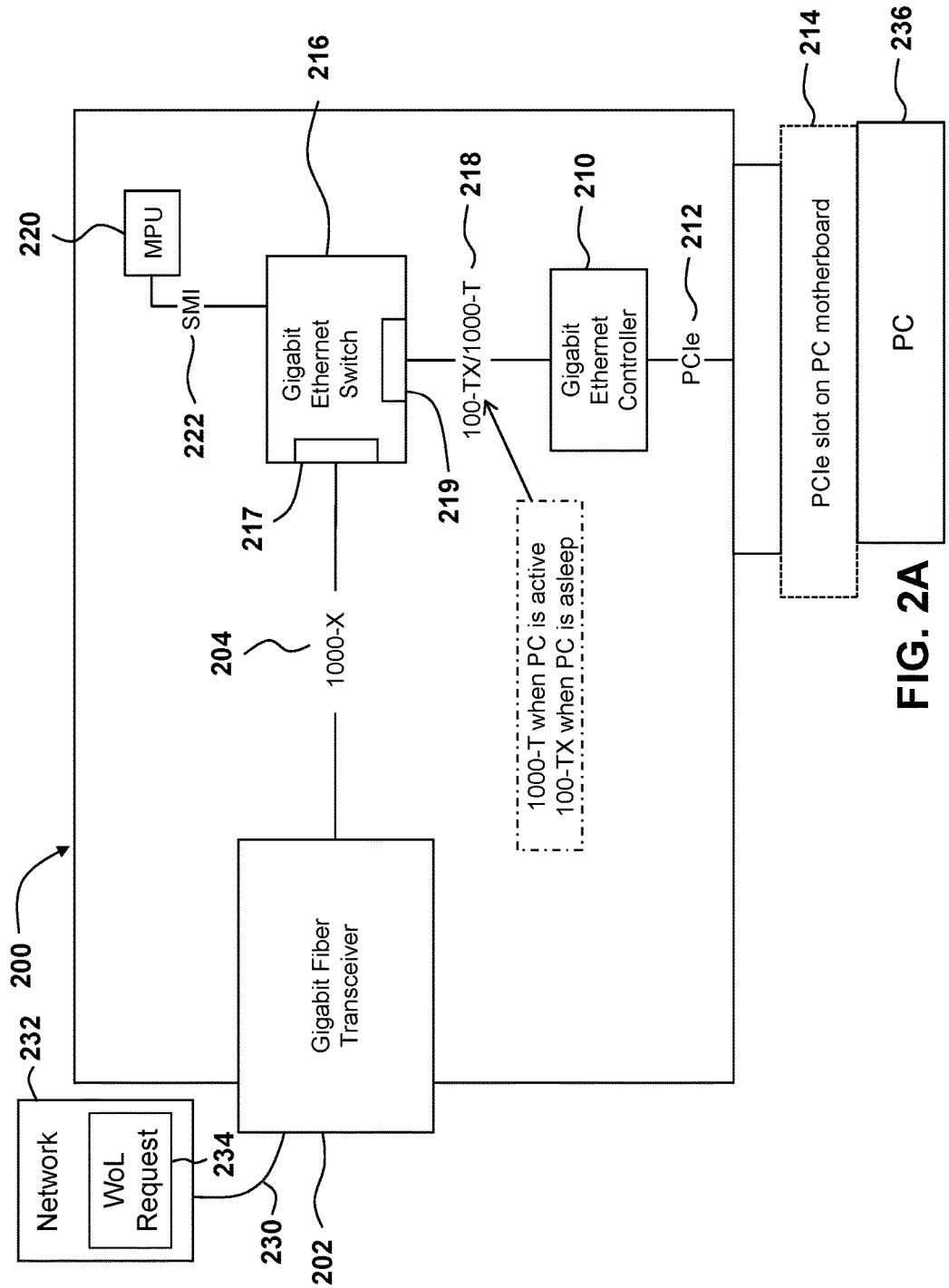
FIG. 2A depicts an exemplary Gigabit Fiber network interface controller (NIC) having Wake on LAN (WoL) capabilities.

FIG. 2A depicts an exemplary Gigabit Fiber network interface controller (NIC) having Wake on LAN (WoL) capabilities, disclosed herein. A fiber network interface controller (NIC) card 200 plugs into an open PCIe slot 214 of a PC and creates network connectivity via a gigabit fiber link 230 to an endpoint, i.e., a connection to an endpoint at the other end of the fiber cable 230. Wake on LAN (WoL) support is added to the Gigabit Fiber NIC card 200 with no driver changes. The disclosed embodiment may include drivers to keep the NIC Controller 200 at 1000-X while asleep In one embodiment, a modified driver may be used to keep link 108 at 1000-T during a sleep mode so that the Gigabit SERDES PHY 106 and the Gigabit Ethernet Controller 110 would be operating at 1000-T link speed, as shown in FIG. 1. Advantageously, the disclosed switch-based solution is applicable to a NIC design using any manufacturer's Gigabit Ethernet Controller 210, providing a switch-based solution 216.

Figure 2B:
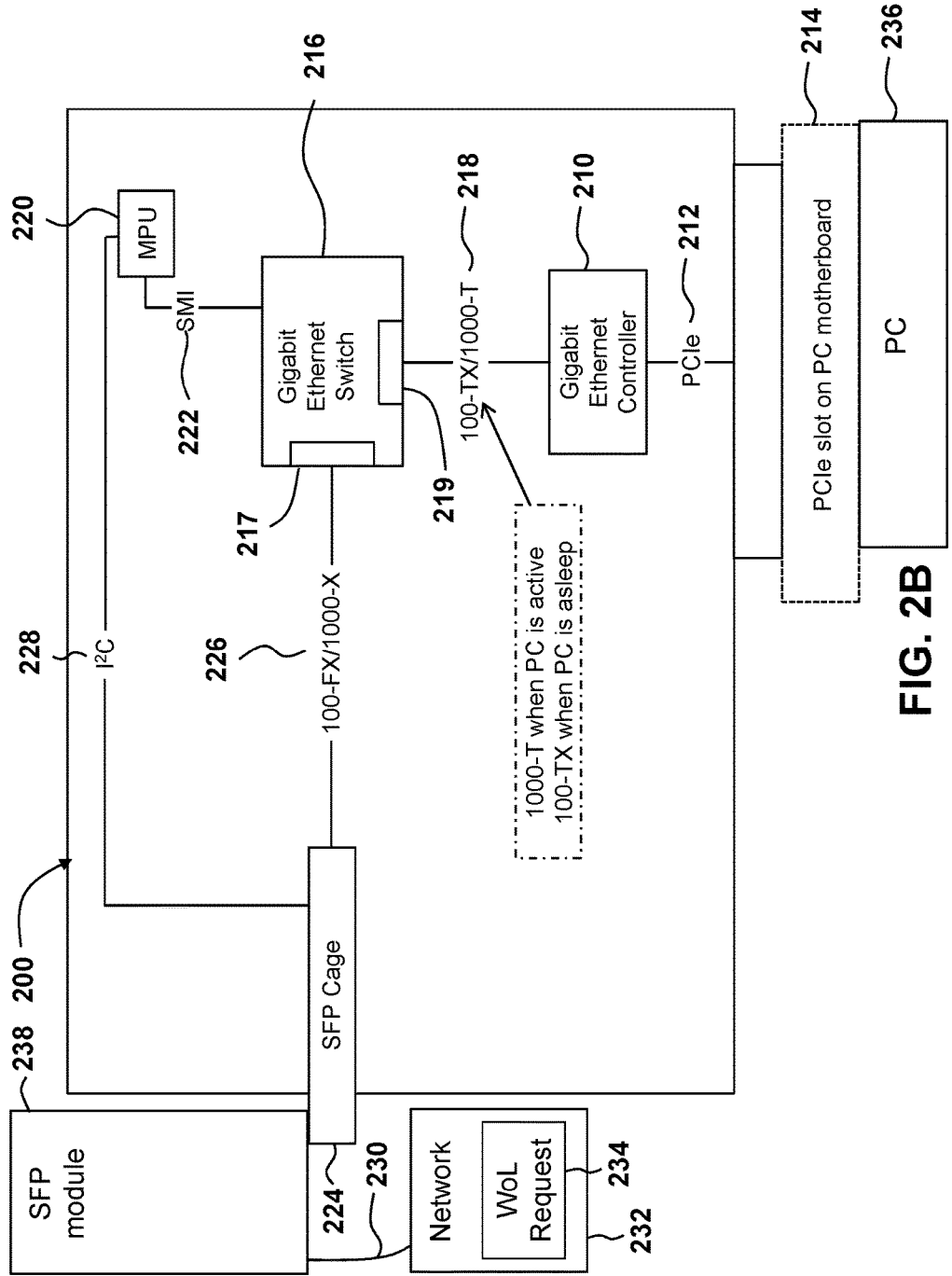
FIG. 2B depicts the exemplary Gigabit Ethernet Controller of FIG. 2A with a small form-factor pluggable (SFP) cage.

The NIC card 200 decouples the link speed of the Gigabit Fiber Transceiver 202 from the link speed of the Gigabit Ethernet Controller 210. This cannot be done with Gigabit SERDES PHY (106, FIG. 1) because the Gigabit SERDES PHY must maintain both links at the same speed. The Gigabit SERDES PHY (106, FIG. 1) is replaced with a small Gigabit Ethernet Switch 216 in the NIC Controller 200. With a switch disclosed herein, the 1000-X port 204 can be set to stay at a constant speed, while allowing the internal connection 218 to the Gigabit Ethernet Controller 210 to adapt as needed. The constant speed may be fixed at 1000-X and determined by the Gigabit Fiber Transceiver 202, as shown in FIG. 2A. In another embodiment, the constant speed may be fixed and determined by the SFP module 238 that the user inserts into the SFP Cage 224. The MPU 220 may read the SFP module 238 speed via an inter-integrated circuit (I²C) link 228 to the SFP cage 224 and set Port 0 217 to either 1000-X or 100-FX to match, as shown in FIG. 2B.

The microprocessor unit (MPU) 220 is programmed to detect link down on the 1000-X 204 and force the 100-TX/1000-T link 218 down so the PC will recognize loss of fiber link 230. In some embodiments, the MPU 220 may be a microprocessor or any device serving the function of a microprocessor, such as a complex programmable logic device (CPLD), a field-programmable gate array (FPGA), a more complex device that also handles the MPU function, etc. Link down may occur when there is no link established to a partner, e.g., a cable is not plugged in, the cable has been broken, a link partner has lost power, etc. This is necessary because the Gigabit Ethernet Switch 216 will not normally pass link status from one port to another. The MPU 220 is programmed to initialize the switch 216 and set it so that it will pass Ethernet packets untouched, which is similar to how the Gigabit SERDES PHY (106, FIG. 1) behaves. The Gigabit Fiber Transceiver 202 is connected to the Gigabit Ethernet Switch 216 at Port 0 of the Gigabit Ethernet Switch 216. The Gigabit Ethernet Controller 210 is connected to the Gigabit Ethernet Switch 216 at Port 3 219 of the Gigabit Ethernet Switch 216. While Port 0 217 and Port 3 219 are used in this description, other Ports may be used depending on the specific Gigabit Ethernet Switch 216 utilized in the NIC card 200. The first port 217 must support a connection to the Gigabit Fiber Transceiver 202 via link 204 or SFP Cage 224 via link 226. The second port 219 must support a connection to the Gigabit Ethernet Controller 210 via link 218.

The switch port 217 electrically coupled to the Gigabit Fiber Transceiver 202 is set to 1000-X 204 and always stays at that speed. The MPU 220 configures the Gigabit Ethernet Switch 216. The switch port 219 electrically coupled to the Gigabit Ethernet Controller 210 is set to Auto-Negotiate. Therefore, during normal operation, the link 218 will negotiate to the highest possible speed (1000-T) 218 and normal traffic will flow at full speed. A PC 236 includes a PCIe slot 214 on the PC motherboard. While a PC 236 is described, the PC 236 may include any computing device having at least one PCIe slot 214. When the PC 236 goes to sleep, and the Gigabit Ethernet Controller 210 drops the link to 100-TX 218, the Gigabit Ethernet Switch 216 will renegotiate and will be able to maintain link at 100-TX 218. This way, a wake packet 234 from a server in the network 232 has a path from the Gigabit Fiber Transceiver 202, through link 204, to the Gigabit Ethernet Switch 216, through link 218, and to the Gigabit Ethernet Controller 210. The Gigabit Ethernet Controller 210 enters a low power mode when the PC 236 is shut off, but can still receive packets from the Gigabit Ethernet Switch 216, only at a lower 100-TX speed. A Gigabit SERDES PHY, by contrast as shown in FIG. 1, breaks the connection with the Gigabit Ethernet Controller 110, because the Gigabit SERDES PHY 106 can only operate when the link speeds (104, 108) between the Gigabit SERDES PHY 106 and the Gigabit Fiber Transceiver 102 and Gigabit Ethernet Controller 110 are the same.

The disclosed switch-based design 216 disclosed includes a hardware architecture change, which physically decouples the link speed 204 of the Gigabit Fiber Transceiver 202 from the link speed 218 of the Gigabit Ethernet Controller 210. Additionally, said switch-based design 216 is portable, i.e., it may be used with any Gigabit Ethernet Controller 210, compared to changing driver settings, which is reliant on the manufacturer's support. The disclosed NIC 200 is able to maintain link during sleep mode and responds to network wake requests 234 generated by a server attached to the network 232. It also remains below the maximum current limit for sleep mode, e.g., 375 mA for "wakeup enabled" systems, and during normal operation passes packets like the PHY-based design 100 would.

The NIC 200 is designed so that external ports, e.g., Gigabit Fiber Transceiver 202, are visible to and controlled by the PC operating system. The operating logic (e.g., executable instructions, firmware, ASIC, etc.) of the Gigabit Ethernet Switch 216 is internal to the NIC 200. Switches may be typically used in multi-port applications. However, the Gigabit Ethernet Switch 216 of the NIC 200 disclosed herein includes ports that will not be visible to the PC 236. The PC 236 communicates directly with the Gigabit Ethernet Controller 210 and so the PC 236 does not "see" any switch ports except for the second port 219 that the Gigabit Ethernet Controller 210 is directly connected to via link 218. In the embodiments disclosed herein, the majority (5/7) of the switch ports of the Gigabit Ethernet Switch 216 are left unused and unconnected. The Gigabit Ethernet Switch 216 is designed so that it behaves like a PHY (i.e., physical layer).

FIG. 2B depicts the exemplary Gigabit Ethernet Controller of FIG. 2A with a small form-factor pluggable (SFP) cage. In some embodiments, the Gigabit Ethernet Switch 216 may be connected, via Port 0 217 and 100-FX/1000X link 226 to a small form-factor pluggable (SFP) cage 224. An SFP module 238 may plug into the SFP cage 224 to offer connection to a network. The SFP module 238 in inserted into the SFP cage 224 to offer the same functionality as the Gigabit Fiber Transceiver 202 as shown in FIG. 2A, but in a removable form for user flexibility. The fiber NIC card 200 plugs into the open PCIe slot 214 of the PC 236 and creates network connectivity via the gigabit fiber link 230 to an endpoint, i.e., a connection to an endpoint at the other end of the fiber cable 230. A wake packet 234 from a server in the network 232 has a path from the SFP module 238, to the SFP Cage 224, through link 226, to the Gigabit Ethernet Switch 216, through link 218, and to the Gigabit Ethernet Controller 210. The MPU 220 may have an inter-integrated circuit ($I^2C$) link 228 to the SFP cage 224 to determine whether an SFP module is present in the SFP cage and take appropriate action to disable or enable Port 3 219 of the Gigabit Ethernet Switch 216 (See FIG. 4).

FIG. 3 depicts an exemplary block diagram 300 of a Wake on LAN (WoL) function for the exemplary Gigabit Ethernet Controller in FIGS. 2A-2B, according to an embodiment disclosed herein. The STM8S framework internally starts up and calls its firmware on the NIC (200, FIGS. 2A-2B) (step 302). The firmware sets up the system clock of the MPU (220, FIGS. 2A-2B) at 16 MHz using an internal oscillator (step 304). The firmware configures all the general-purpose input/output (GPIO) pins: $I^2C$; SMI; SFP; etc. (step 306). The firmware enters its processing loop. In each round it waits about 2 ms to do the one-way smart missing link (SML) process (step 308). The firmware disables the copper link, 218 in FIGS. 2A-2B between the Gigabit Ethernet Controller 210 and the second port 219 of the Gigabit Ethernet Switch 216, if the fiber link is detected down. Otherwise, it enables the copper link (step 310).

Figure 4:
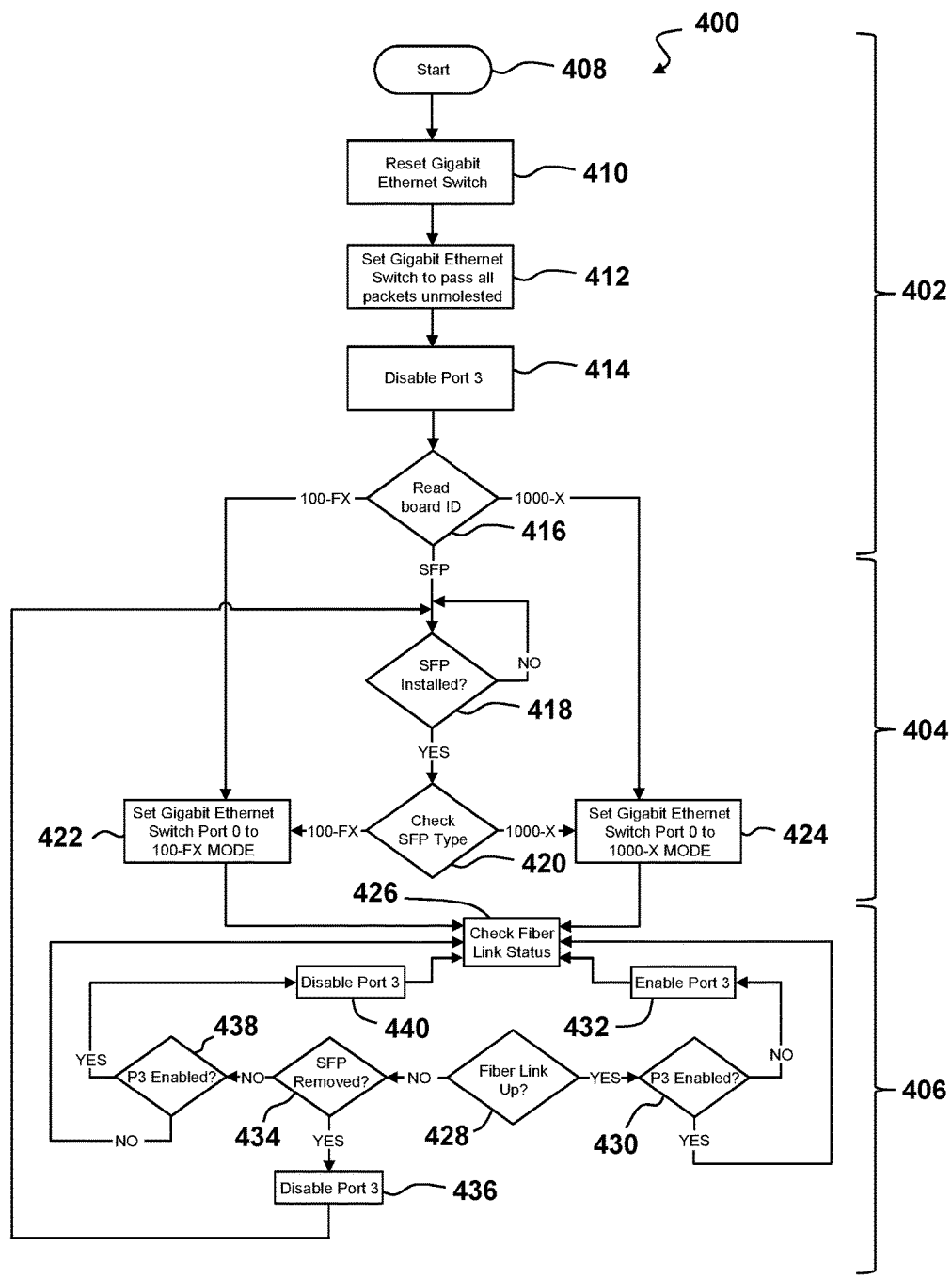
FIG. 4 depicts an exemplary flowchart for the MPU communicating with the Gigabit Ethernet Controller in FIGS. 2A-2B.

FIG. 4 depicts an exemplary flowchart 400 for the MPU communicating with the Gigabit Ethernet Controller in FIGS. 2A-2B via a serial management interface (SMI) (222, FIGS. 2A-2B) with no Ethernet data path between the MPU and the Gigabit Ethernet Controller. FIG. 4 depicts a more detailed flowchart 400 of the steps shown in FIG. 3. The flowchart 400 includes three stages. The initialization stage 402 includes initialization steps that only happen when power is applied to the NIC (200, FIGS. 2A-2B). The set-up stage 404 includes steps to set the fiber port speed appropriately. The fiber link status stage 406 includes steps to pass the fiber link status through to the Gigabit Ethernet Controller (210, FIGS. 2A-2B).

The initialization stage 402 is started when power is applied to the NIC (200, FIGS. 2A-2B) (step 408). The MPU (220, FIGS. 2A-2B) resets all of the Gigabit Ethernet Switch (216, FIGS. 2A-2B) setting to default (step 410). The MPU sets the Gigabit Ethernet Switch to pass all packets unmolested (step 412). Forward spanning tree frames, management frames are treated as normal frames, and VLAN tags are ignored. The Gigabit Ethernet Switch does not modify any packets that pass through it. Port 3 (219, FIGS. 2A-2B), or a second port depending on the manufacturer, is powered down, which will cause the link (218, FIGS. 2A-2B) between the Gigabit Ethernet Switch and the PCIe controller to go down (step 414). This will cause the operating system (OS) of the PC (236, FIG. 2A) to indicate 'no link.' The board ID is read (step 416). The board ID is hardcoded as part of the system board 200, and helps the firmware distinguish between a system with a Gigabit Fiber Transceiver 202, as in FIG. 2A, or a SFP Cage 224 and SFP module 238, as in FIG. 2B. Two of the MPU's general-purpose input/output pins (GPIO) are used to indicate what type of optic (202, 224, FIGS. 2A-2B) is installed. The GPIO pins are individually connected to either a voltage or ground, giving four possibilities, i.e., 00, 01, 10, or 11. Three of those possibilities can be used to determine if the optic type is 100-FX, 1000-FX, or SFP.

The link status stage 406 starts by checking to see if an SFP Module (238, FIG. 2B) is installed into an SFP Cage (224, FIG. 2B) (step 418). One of the MPU's GPIO's is connected to the SFP cage's (224, FIG. 2B) "present" pin. This pin is used to indicate when an SFP module is present in the SFP cage. The MPU can monitor this pin to know when a user has installed an SFP module connecting the NIC card to a network. The MPU checks the SFP type, i.e., whether the speed of the module is 100-FX or 1000-X type (step 420). The MPU communicates with the MSA-compliant SFP module via the I²C interface (228, FIG. 2B). The MPU reads the bit rate (BR) field to determine whether the installed SFP is 100-FX (100 Mb/s) or 1000-X (1000 Mb/s) type. If the SFP is 100-FX type, then the MPU sets the Gigabit Ethernet Switch Port 0 (217, FIG. 2B) to 100-FX mode (step 422). If the SFP is 1000-X type, then the MPU sets the Gigabit Ethernet Switch Port 0 to 1000-X mode (step 424). The speed and interface of the first port (217, FIG. 2B) are set to match the speed and interface of the SFP module (238, FIG. 2B). The steps in the link status stage 406 are only present in NIC models with an SFP cage (FIG. 2B).

The fiber link status stage 406 starts by checking the fiber link status (step 426). The fiber link status may be fiber link status of the Gigabit Fiber Transceiver (202, FIG. 2A) or the SFP Module (238, FIG. 2B) depending on the board (200, FIGS. 2A-2B) type. The MPU reads the Gigabit Ethernet Switch's port status register (PSR) to determine if the fiber link is up (step 428). If the fiber link is up, the MPU checks if Port 3 (219, FIGS. 2A-2B) of the Gigabit Ethernet Switch is currently enabled (step 430). If Port 3 is enabled, then the MPU continues to check the fiber link status (step 426). If Port 3 is disabled, then the MPU enables Port 3 (step 432). If the fiber link is not up, the MPU will check if the SFP is removed, e.g., by a user (step 434). One of the MPU's GPIO's is connected to the SFP cage's (224, FIG. 2B) "present" pin. This pin is used to indicate when an SFP module is present in the SFP cage. The MPU can monitor this pin to know when a user has removed an SFP module connecting the NIC card to a network. This step is only present on NIC models with an SFP cage (FIG. 2B). If the SFP has been removed, the MPU will disable Port 3 (step 436). If the SFP is not removed, the MPU will check if Port 3 is currently enabled (step 438). If Port 3 is currently enabled, then Port 3 will be disabled (440). If Port 3 is not enabled, then the MPU will continue to check the fiber link status (step 426). While the above method is disclosed for the NIC 200 having a removable SFP module 238 as shown in FIG. 2B, the same steps may be applied to the NIC 200 having a Gigabit Fiber Transceiver 202 as shown in FIG. 2A, except that the Gigabit Fiber Transceiver 202 cannot physically be removed so the check (step 418) will always indicate that the module 202 is present.

Figure 5:
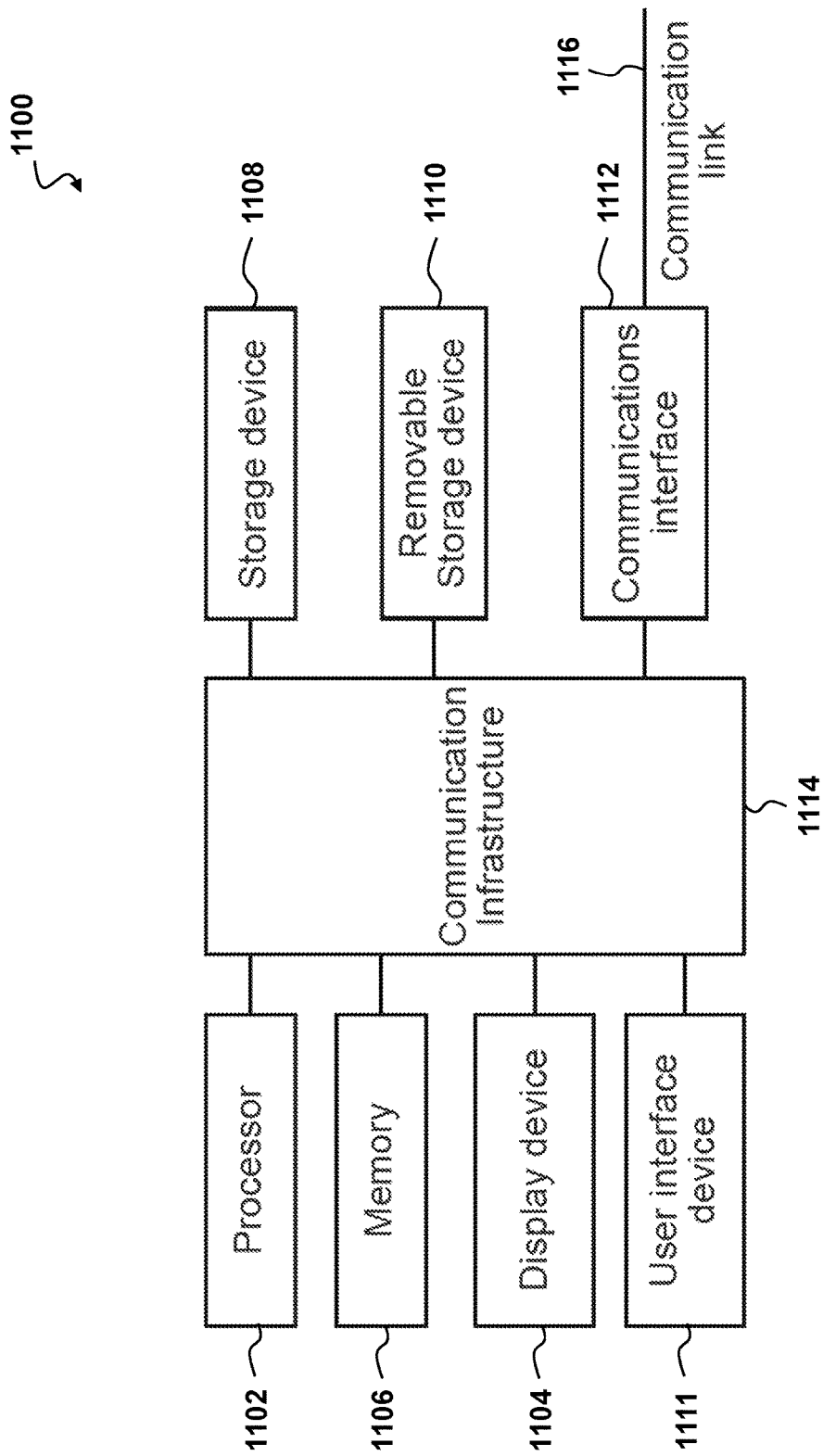
FIG. 5 shows a high-level block diagram and process of a computing system for implementing an embodiment of the system and process.

FIG. 5 is a high-level block diagram 1100 showing a computing system comprising a computer system useful for implementing an embodiment of the system and process, disclosed herein. Embodiments of the system may be implemented in different computing environments. The computer system includes one or more processors 1102, and can further include an electronic display device 1104 (e.g., for displaying graphics, text, and other data), a main memory 1106 (e.g., random access memory (RAM)), storage device 1108, a removable storage device 1110 (e.g., removable storage drive, a removable memory module, a magnetic tape drive, an optical disk drive, a computer readable medium having stored therein computer software and/or data), user interface device 1111 (e.g., keyboard, touch screen, keypad, pointing device), and a communication interface 1112 (e.g., modem, a network interface (such as an Ethernet card), a communications port, or a PCMCIA slot and card). The communication interface 1112 allows software and data to be transferred between the computer system and external devices. The system further includes a communications infrastructure 1114 (e.g., a communications bus, cross-over bar, or network) to which the aforementioned devices/modules are connected as shown.

Information transferred via communications interface 1114 may be in the form of signals such as electronic, electromagnetic, optical, or other signals capable of being received by communications interface 1114, via a communication link 1116 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1112. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 6:
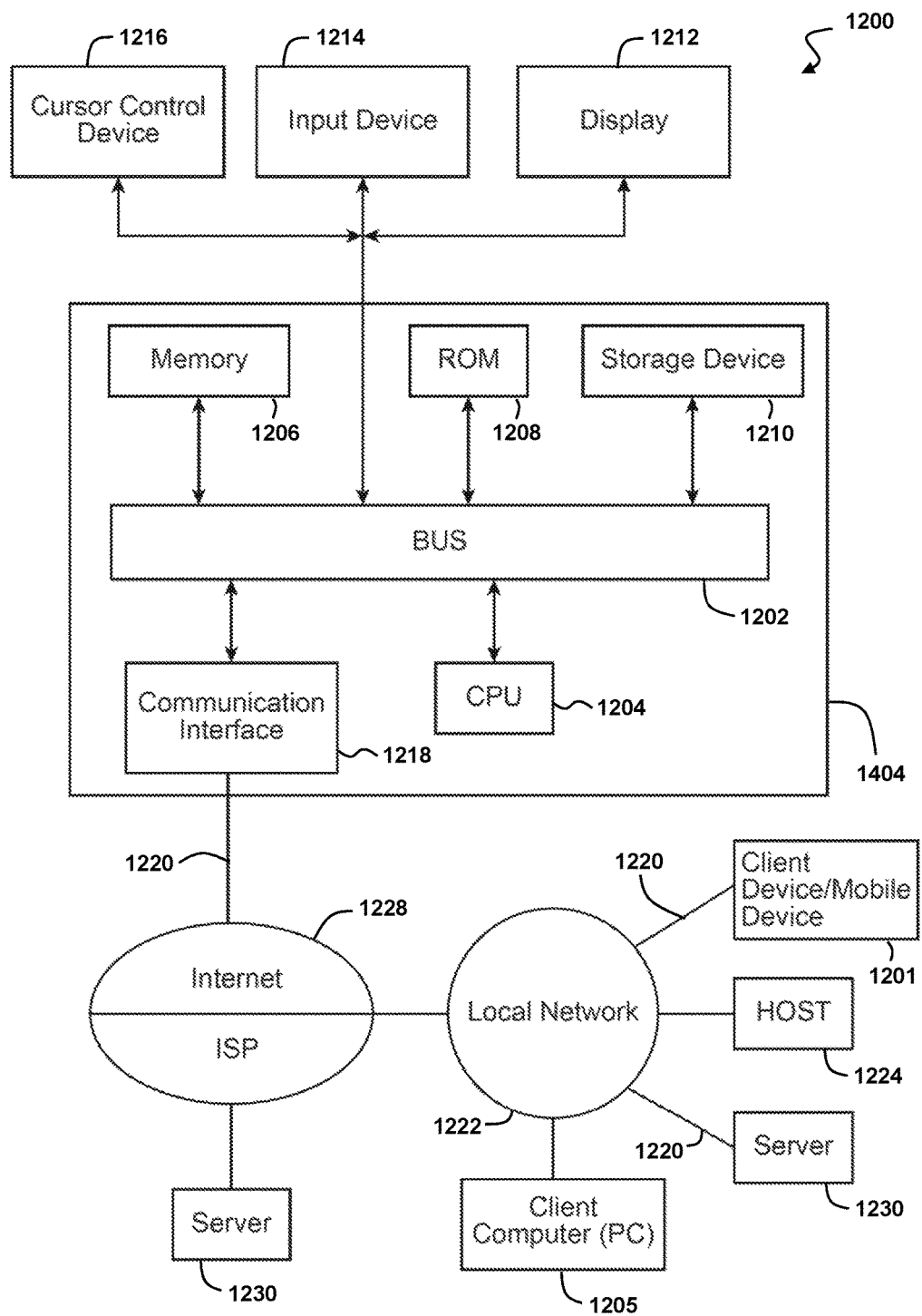
FIG. 6 shows a block diagram and process of an exemplary system in which an embodiment may be implemented.

FIG. 6 shows a block diagram of an example system 1200 in which an embodiment may be implemented. The system 1200 includes one or more client devices 1201 such as consumer electronics devices, connected to one or more server computing systems 1230. A server 1230 includes a bus 1202 or other communication mechanism for communicating information, and a processor (CPU) 1204 coupled with the bus 1202 for processing information. The server 1230 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution or instructions to be executed by the processor 1204. The server computer system 1230 further includes a read only memory (ROM) 1208 or other static storage device coupled to the bus 1202 for storing static information and instructions for the processor 1204. A storage device 1210, such as a magnetic disk or optical disk, is provided and coupled to the bus 1202 for storing information and instructions. The bus 1202 may contain, for example, thirty-two address lines for addressing video memory or main memory 1206. The bus 1202 can also include, for example, a 32-bit data bus for transferring data between and among the components, such as the CPU 1204, the main memory 1206, video memory and the storage 1210. Alternatively, multiplex data/address lines may be used instead of separate data and address lines.

The server 1230 may be coupled via the bus 1202 to a display 1212 for displaying information to a computer user. An input device 1214, including alphanumeric and other keys, is coupled to the bus 1202 for communicating information and command selections to the processor 1204. Another type or user input device comprises cursor control 1216, such as a mouse, a trackball, or cursor direction keys for communicating direction information and command selections to the processor 1204 and for controlling cursor movement on the display 1212.

According to one embodiment, the functions are performed by the processor 1204 executing one or more sequences of one or more instructions contained in the main memory 1206. Such instructions may be read into the main memory 1206 from another computer-readable medium, such as the storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the server 1230 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received from the main memory 1206 may optionally be stored on the storage device 1210 either before or after execution by the processor 1204.

The server 1230 also includes a communication interface 1218 coupled to the bus 1202. The communication interface 1218 provides a two-way data communication coupling to a network link 1220 that is connected to the world wide packet data communication network now commonly referred to as the Internet 1228. The Internet 1228 uses electrical, electromagnetic or optical signals that carry digital data streams. The signals through the various networks and the signals on the network link 1220 and through the communication interface 1218, which carry the digital data to and from the server 1230, are exemplary forms or carrier waves transporting the information.

In another embodiment of the server 1230, interface 1218 is connected to a network 1222 via a communication link 1220. For example, the communication interface 1218 may be an integrated services digital network (ISDN) card or a modem to provide a data communication connection to a corresponding type of telephone line, which can comprise part of the network link 1220. As another example, the communication interface 1218 may be a local area network (LAN) card to provide a data communication connection to a compatible LAN. Wireless links may also be implemented. In any such implementation, the communication interface 1218 sends and receives electrical electromagnetic or optical signals that carry digital data streams representing various types of information.

The network link 1220 typically provides data communication through one or more networks to other data devices. For example, the network link 1220 may provide a connection through the local network 1222 to a host computer 1224 or to data equipment operated by an Internet Service Provider (ISP). The ISP in turn provides data communication services through the Internet 1228. The local network 1222 and the Internet 1228 both use electrical, electromagnetic or optical signals that carry digital data streams. The signals through the various networks and the signals on the network link 1220 and through the communication interface 1218, which carry the digital data to and from the server 1230, are exemplary forms or carrier waves transporting the information.

The server 1230 can send/receive messages and data, including e-mail, program code, through the network, the network link 1220 and the communication interface 1218. Further, the communication interface 1218 can comprise a USB/Tuner and the network link 1220 may be an antenna or cable for connecting the server 1230 to a cable provider, satellite provider or other terrestrial transmission system for receiving messages, data and program code from another source.

The example versions of the embodiments described herein may be implemented as logical operations in a distributed processing system such as the system 1200 including the servers 1230. The logical operations of the embodiments may be implemented as a sequence of steps executing in the server 1230, and as interconnected machine modules within the system 1200. The implementation is a matter of choice and can depend on performance of the system 1200 implementing the embodiments. As such, the logical operations constituting said example versions of the embodiments are referred to for e.g., as operations, steps or modules.

Similar to a server 1230 described above, a client device 1201 can include a processor, memory, storage device, display, input device and communication interface (e.g., e-mail interface) for connecting the client device to the Internet 1228, the ISP, or LAN 1222, for communication with the servers 1230.

The system 1200 can further include computers (e.g., personal computers, computing nodes) 1205 operating in the same manner as client devices 1201, wherein a user can utilize one or more computers 1205 to manage data in the server 1230.

Figure 7:
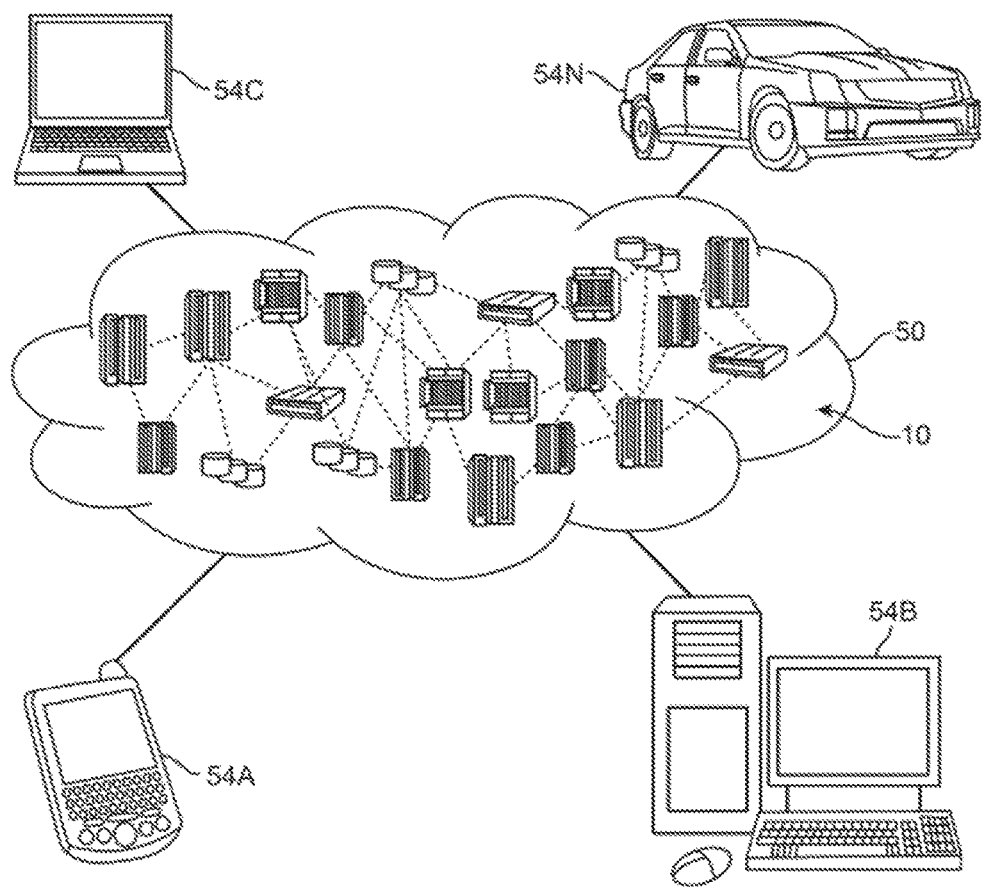
FIG. 7 depicts a cloud computing environment for implementing an embodiment of the system and process disclosed herein.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method comprising:
   resetting, by a microprocessor unit (MPU) in communication with a Gigabit Ethernet Switch via a serial management interface (SMI), all of the Gigabit Ethernet Switch settings to default;
   disabling, by the MPU, a port linking the Gigabit Ethernet Switch and a Gigabit Ethernet Controller causing a PC connected to the Gigabit Ethernet Controller to indicate no link;
   reading, by the MPU, a board ID to determine a type of optic installed; and
   determining, by the MPU in communication with a small form-factor pluggable (SFP) cage via an inter-integrated circuit (I²C) link, if an SFP module is installed;
   wherein if the SFP module is installed, further comprising:
   determining, by the MPU, a type of the installed SFP module;
   setting, by the MPU, a port of the Gigabit Ethernet Switch linking the Gigabit Ethernet Switch and the SFP Cage to a 100-FX mode if the determined type of the installed SFP module is 100-FX type; and
   setting, by the MPU, the port of the Gigabit Ethernet Switch linking the Gigabit Ethernet Switch and the SFP Cage to a 1000-X mode if the determined type of the installed SFP module is 1000-X type.

2. The method of claim 1, further comprising:
   determining, by the MPU, a fiber link status.

3. A system comprising:
   a network interface controller (NIC), comprising:
   a small form-factor pluggable (SFP) Cage;
   an SFP Module, wherein the SFP Cage is configured to receive the SFP Module;
   a PCIe slot on a PC motherboard of a PC, wherein the PCIe slot is configured to receive the NIC;
   a Gigabit Ethernet Controller;
   a Gigabit Ethernet Switch; and a microprocessor unit (MPU);
wherein the Gigabit Ethernet Switch maintains a link between the Gigabit Ethernet Controller and the SFP Cage whether or not a link speed between the Gigabit Ethernet Switch and the SFP Cage matches a link speed between the Gigabit Ethernet Switch and the Gigabit Ethernet Controller;
wherein the MPU configures the Gigabit Ethernet Switch to match the link speed between the Gigabit Ethernet Switch and the SFP Cage with the link speed between the Gigabit Ethernet Switch and the Gigabit Ethernet Controller during normal operation;
wherein the Gigabit Ethernet Controller can respond to a Wake on LAN (WoL) request from a network; and
wherein the MPU is further configured to detect a link down on a first port of the Gigabit Ethernet Switch connected to the SFP Cage, and wherein the MPU is further configured to pass a status of the link down to a second port of the Gigabit Ethernet Switch connected to the Gigabit Ethernet Controller, wherein the PC receives the status as a loss of fiber link.

4. The system of claim 3, wherein the MPU is further configured to read the SFP module speed via an inter-integrated circuit ($I^2C$) link between the MPU and the SFP cage when the SFP Module is detachably attached to the SFP Cage.

5. The system of claim 3, wherein the link speed between the Gigabit Ethernet Switch and the Gigabit Ethernet Controller when the PC is active is one of: 1000-T and 100-TX.

6. The system of claim 3, wherein the WoL request from the network is received at the Gigabit Ethernet Controller.

7. A system comprising:
a network interface controller (NIC), comprising:
a small form-factor pluggable (SFP) Cage;
an SFP Module, wherein the SFP Cage is configured to receive the SFP Module;
a PCIe slot on a PC motherboard of a PC, wherein the PCIe slot is configured to receive the NIC;
a Gigabit Ethernet Controller;
a Gigabit Ethernet Switch; and
a microprocessor unit (MPU);
wherein the Gigabit Ethernet Switch maintains a link between the Gigabit Ethernet Controller and the SFP Cage whether or not a link speed between the Gigabit Ethernet Switch and the SFP Cage matches a link speed between the Gigabit Ethernet Switch and the Gigabit Ethernet Controller;
wherein the MPU configures the Gigabit Ethernet Switch to match the link speed between the Gigabit Ethernet Switch and the SFP Cage with the link speed between the Gigabit Ethernet Switch and the Gigabit Ethernet Controller during normal operation;
wherein the Gigabit Ethernet Controller can respond to a Wake on LAN (WoL) request from a network; and
wherein a first port of the Gigabit Ethernet Switch connected to the SFP Cage is set at a constant link speed, wherein a second port of the Gigabit Ethernet Switch connected to the Gigabit Ethernet Controller is set to auto-negotiate to a highest possible link speed, and wherein the Gigabit Ethernet Controller enters a low power mode when the PC is turned off, and wherein the WoL request from the network is received at the Gigabit Ethernet Controller.

8. The system of claim 7, wherein the MPU is further configured to read the SFP module speed via an inter-integrated circuit (I2C) link between the MPU and the SFP cage when the SFP Module is detachably attached to the SFP Cage.

9. The system of claim 7, wherein the link speed between the Gigabit Ethernet Switch and the Gigabit Ethernet Controller when the PC is active is one of: 1000-T and 100-TX.

10. The system of claim 7, wherein a second port of the Gigabit Ethernet Switch connected to the SFP Cage is set to auto-negotiate to a highest possible link speed, and wherein the Gigabit Ethernet Controller enters a low power mode when the PC is turned off.

11. The system of claim 7, wherein the WoL request from the network is received at the Gigabit Ethernet Controller.

\* \* \* \* \*